C. H. HOWARD & H. M. PFLAGER.
CAR TRUCK.
APPLICATION FILED SEPT. 17, 1912.
1,066,819.
Patented July 8, 1913.
2 SHEETS—SHEET 1.
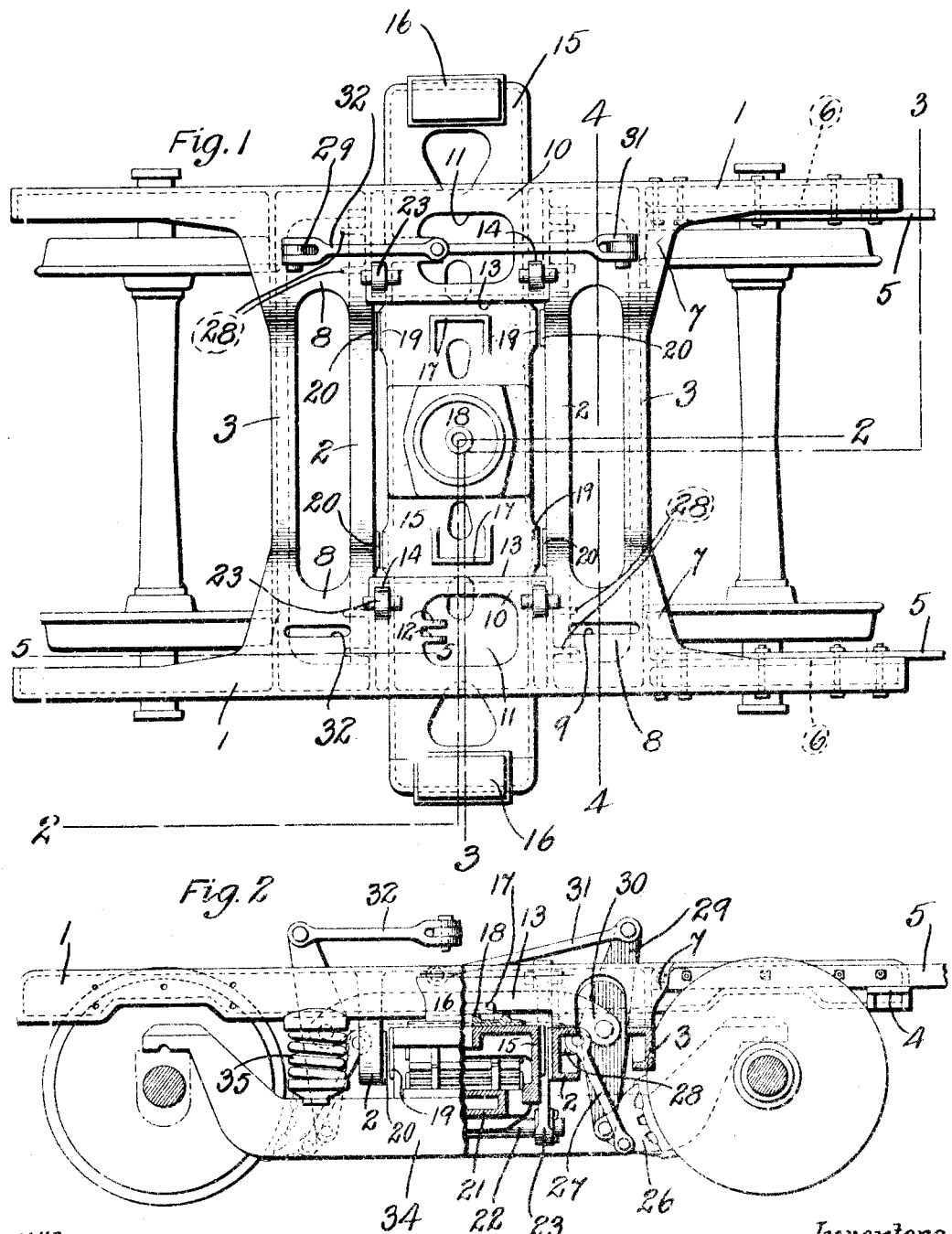
Witnesses
Inventors
Clarence H. Howard
Harry M. Pflager
By _____ Atty

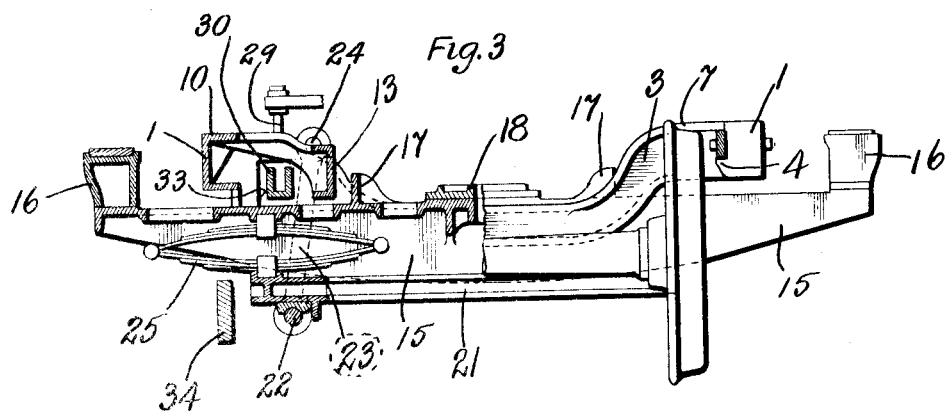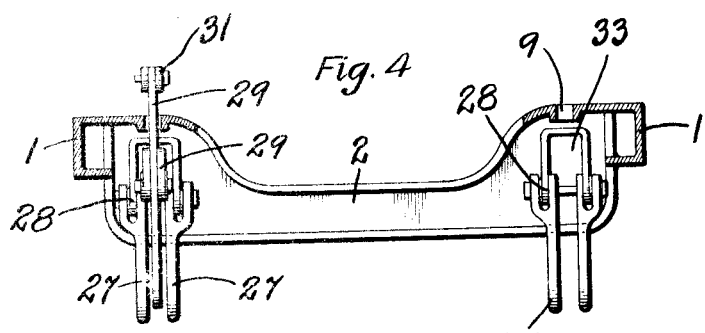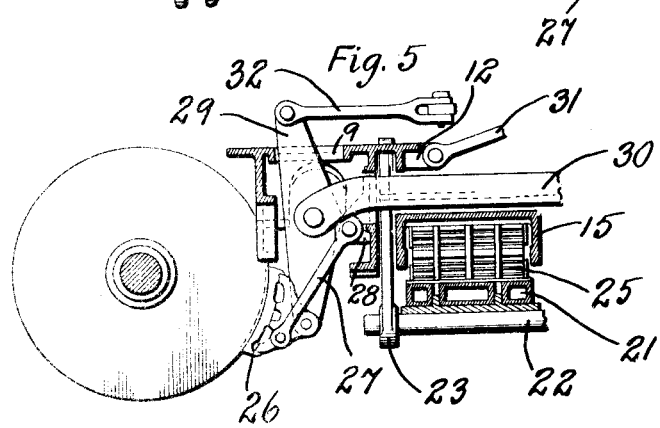

UNITED STATES PATENT OFFICE.

CLARENCE H. HOWARD AND HARRY M. PFLAGER, OF ST. LOUIS, MISSOURI, ASSIGNORS TO COMMONWEALTH STEEL COMPANY, OF ST. LOUIS, MISSOURI, A CORPORATION OF NEW JERSEY.

CAR-TRUCK.

1,066,819.     Specification of Letters Patent.     Patented July 8, 1913.

Application filed September 17, 1912. Serial No. 720,807.

*To all whom it may concern:*

Be it known that we, CLARENCE H. HOWARD and HARRY M. PFLAGER, citizens of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification, in which—

Figure 1 is a top plan view of a four-wheel truck constructed in accordance with our invention. Fig. 2 is a side elevational view and vertical, longitudinal sectional view taken on the line 2—2 of Fig. 1. Fig. 3 is a vertical, cross-sectional view taken approximately on the line 3—3 of Fig. 1. Fig. 4 is a transverse sectional view taken approximately on the line 4—4 of Fig. 1. Fig. 5 is a detail section taken approximately on the line 5—5 of Fig. 1.

Our invention relates to new and useful improvements in car trucks, the principal object of our invention being to provide a comparatively simple, strong, rigid truck frame wherein a number of essential parts are cast integral, thereby forming a truck which is comparatively inexpensive in manufacture.

Further objects of our invention are, to provide the end portions of the wheel pieces of the truck with supports and means for attachment of the bars which carry the axle-driven light generator, to provide a truck with a strong and rigid one-piece, cast metal bolster that is substantially of inverted trough shape in cross section, the ends of which bolster project beyond the wheel pieces of the truck frame and carry side bearing members, to provide a truck with a beamless brake rigging and to arrange and form certain parts of the truck frame so as to receive and support parts of said beamless brake rigging.

With the above and other objects in view, our invention consists in certain novel features of construction and arrangement of parts hereinafter more fully described and claimed.

As shown in the accompanying drawings which illustrate the preferred form of our invention, wheel pieces 1 and transoms 2 and 3 are formed integral, preferably by casting with the transoms arranged in pairs on opposite sides of the transverse center of the truck frame, and the space between the transoms 2 is occupied by the truck bolster. The wheel pieces 1 and transoms 2 and 3 are suitably flanged in order to give the necessary strength and rigidity, and said parts are preferably channel-shape in cross section. The central portions of the transoms are depressed, as shown in Figs. 3 and 4, so as to accommodate a center sill member or girder of extra depth.

Formed on or fixed to one or both ends of the wheel pieces 1 and on the inner faces thereof are lugs 4 which serve as supports for the bars 5 that carry the axle-driven light generator (not shown). The inner ends of these bars lie immediately against and are fixed to vertically disposed webs or walls 6 formed on the inner portions of the ends of the wheel pieces, and the extreme end portions of said bars 5 engage beneath gusset plates 7 formed integral with the wheel pieces and transoms 3. The bars 5 resting upon the lugs 4 and bearing against the undersides of the gusset plates are supported in a firm and substantial manner, and such arrangement relieves the rivets or bolts utilized for attaching said bars to the wheel pieces of all shearing strains.

Formed integral with the end portions of the transoms 2 and 3 and with the corresponding portions of the wheel pieces 1, are top gusset plates 8 in which are formed longitudinally extending slots 9 which are for the purpose of accommodating the upwardly projecting portions of the brake levers, hereinafter described.

Formed integral with the end portions of the transoms 2 and central portions of the wheel pieces 1 are top gusset plates 10 in which are formed openings 11, and formed integral with these plates to one side of the openings therein are lugs 12 arranged in pairs, and which lugs serve as points of attachment for parts of the brake rigging.

Formed integral with and depending from the inner edges of the plates 10 are vertically disposed web plates 13. Formed through the plates 10 adjacent to the inner faces of the transoms 2 are openings 14 which receive the upper ends of the spring plank hangers, and formed in the transoms 2 and plates 10 to the sides of these openings are suitable bearings which receive the upper pivot pins of said spring plank hangers.

The bolster 15 utilized in connection with the truck frame is preferably cast in a single piece and comprises a top plate and side walls, and therefore said bolster is substantially of inverted trough shape in cross section. The end portions of this bolster project beyond the wheel pieces 1 and carry suitable side bearing members 16. Formed on or fixed to the top plate of this bolster are upwardly projecting lugs 17 which normally occupy positions adjacent to and inside the depending web plates 13, and these lugs perform the function of stops to engage against said web plates and limit the transverse movement of the bolster with respect to the truck frame. Formed on or fixed to the top and central portion of the bolster is a center bearing plate 18 of the usual form. Formed on or fixed to the outer faces of the side plates of the bolster 15 are chafing plates 19, and formed on the adjacent faces of the transoms 2 are corresponding chafing plates 20.

21 designates a spring plank of ordinary form, the ends of which are suitably mounted on supporting rods 22, carried by the lower ends of spring plank hangers 23, the upper ends of which project through the openings 14 in the plates 10, and said upper ends receive short pins 24 that occupy the bearings 14. Interposed between the end portions of the spring plank 21 and the top plate of the bolster are the usual elliptic springs 25.

The brake rigging utilized in connection with our improved truck is of the beamless type and comprises ordinary brake heads 26, each one of which is supported by a pair of swing hangers or links 27, the upper ends of which are pivotally connected to lugs 28, which latter are formed integral with and project outwardly from the outer faces of the vertical webs of the transoms 2. Pivotally connected to each brake head 26 is a vertically disposed brake lever 29, and the corresponding pairs of these levers on the sides of the truck frame are connected by horizontally disposed links or members 30, the ends of which are pivotally connected to the central portions of said levers 29. The upper portions of the brake lever 29 pass upwardly through the slots 9 in the gusset plates 8, and the upper ends of the levers on one end of the truck frame are pivotally connected to links 31, the opposite ends of which are pivotally connected to the lugs or ears 12. The upper ends of the brake levers 29 on the opposite end of the truck are connected by means of links 32 to one of the floating levers of the brake rigging. The brake lever connecting members or rods 30 pass through suitable openings 33 formed in the end portions of the transoms 2 and overlie the end portions of the bolster 15.

Our improved truck frame is equipped with the usual detachable pedestals, (not shown), and bearing on the journal boxes between said pedestals are the ends of the usual equalizer bars 34. The usual heavy coil springs 35 are interposed between the wheel pieces 1 and the equalizer bars 34.

A car truck of our improved construction is comparatively simple, can be easily and cheaply manufactured for the reason that the main parts of the truck frame, namely, the wheel pieces and transoms are formed in a single piece, thereby eliminating the time and labor usually required in assembling the essential parts of a built-up truck frame, and by our improved construction, the various supports for the axle-driven light generator carrying bars and supports for the beamless brake rigging are cast integral with the truck frame.

One of the particular features of our improved construction is the supporting of the brake heads by means of hangers from the truck frame and the direct attachment of the brake levers to said brake heads, which arrangement does away with the expense and additional weight of brake beams.

It will be readily understood that minor changes in the size, form and construction of the various parts of our improved truck can be made and substituted for those herein shown and described without departing from the spirit of our invention, the scope of which is set forth in the appended claims.

We claim:

1. In a car truck, a cast metal truck frame devoid of end rails, and means on the inner faces of the end portions of the wheel pieces of said truck frame for supporting and attaching dynamo carrying bars, which means comprises lugs projecting outwardly from the inner faces of said wheel pieces near their ends, and vertically disposed webs on the inner faces of said wheel pieces to which said dynamo carrying bars are attached.

2. In a car truck, a cast metal truck frame devoid of end rails, the wheel pieces of which frame are substantially channel shaped in cross section, vertically disposed plates integral with said wheel pieces on the insides thereof, which plates are adapted to serve as points of attachment for the inner ends of dynamo carrying bars, and shoulders on the inner faces of said wheel pieces near their outer ends, which shoulders engage beneath said dynamo carrying bars.

3. In a car truck, a cast metal truck frame, devoid of end rails, and lugs integral with the wheel pieces at one end of the truck frame, which lugs project outwardly from the inner faces of said wheel pieces, and form supports for dynamo carrying bars.

4. In a car truck, a truck frame, cast in a single piece, and comprising a pair of wheel pieces, transoms arranged in pairs, the inner members of which pairs of transoms are provided with horizontally alined openings adapted to receive parts of the truck brake rigging, and gusset plates between the ends of the transoms and the wheel pieces, which gusset plates are provided with openings for vertically disposed parts of the brake rigging, and with openings for the upper ends of the spring plank swing hangers.

5. In a car truck, a truck frame formed in a single piece and comprising wheel pieces, pairs of transoms and gusset plates between the end portions of the transoms and the adjacent portions of the wheel pieces, certain of which gusset plates are provided with openings for parts of the brake rigging and with openings for the upper ends of the spring plank swing hangers, and the inner members of the pairs of transoms being provided with horizontally alined openings adapted to receive parts of the brake rigging.

6. In a car truck, a truck frame cast in a single piece, and comprising wheel pieces, pairs of transoms and gusset plates between the end portions of the transoms, and the adjacent portions of the wheel pieces, certain of which gusset plates are provided with openings adapted to receive parts of the brake rigging, the inner members of the transoms being provided with openings adapted to receive parts of the brake rigging, and brake hanger pivot lugs integral with the inner members of the transoms below the openings therein.

7. In a car truck, a truck frame cast in a single piece and comprising wheel pieces, pairs of transoms and gusset plates between the end portions of the transoms and the adjacent portions of the wheel pieces, certain of which gusset plates are provided with openings adapted to receive parts of the brake rigging, the inner members of the transoms being provided with openings adapted to receive parts of the brake rigging, brake hanger pivot lugs integral with the inner members of the transoms below the openings therein, and lugs on the gusset plates between the inner members of the pairs of transoms for the attachment of links forming a part of the truck brake rigging.

8. In a car truck, a truck frame having wheel pieces and transoms arranged in pairs, of gusset plates between the end portions of said pairs of transoms, which gusset plates are provided with longitudinally extending openings for the accommodation of vertically disposed parts of the brake rigging, brake hanger attaching lugs on the transoms below said gusset plates and there being openings formed in the transoms below said brake hanger lugs, which openings are adapted to receive horizontally disposed parts of the brake rigging.

9. In a car truck, a truck frame having wheel pieces and pairs of transoms, gusset plates integral with the end portions of the transoms and the adjacent portions of said wheel pieces, certain of which gusset plates are provided with longitudinally disposed openings for the accommodation of vertically disposed brake levers, brake hanger lugs on the transoms beneath said openings, lugs on certain of the gusset plates for the attachment of links of the brake rigging and there being openings formed in the transoms beneath the brake hanger lugs, which openings are adapted to receive horizontally disposed parts of said brake rigging.

In testimony whereof we hereunto affix our signatures in the presence of two witnesses, this 30th day of August, 1912.

CLARENCE H. HOWARD.
HARRY M. PFLAGER.

Witnesses:
HAL C. BELLVILLE,
FRED H. BLANKENHORN.